United States Patent
Lepcha et al.

(10) Patent No.: US 10,795,674 B2
(45) Date of Patent: *Oct. 6, 2020

(54) AUTOMATIC SCALING OF MICROSERVICES APPLICATIONS

(71) Applicant: Juniper Networks, Inc., Sunnyvale, CA (US)

(72) Inventors: Jalandip Lepcha, Sunnyvale, CA (US); Tong Jiang, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 16/270,077

(22) Filed: Feb. 7, 2019

(65) Prior Publication Data

US 2019/0171447 A1 Jun. 6, 2019

Related U.S. Application Data

(63) Continuation of application No. 15/388,014, filed on Dec. 22, 2016, now Pat. No. 10,223,109.

(51) Int. Cl.
*G06F 9/28* (2006.01)
*G06F 9/50* (2006.01)
*G06F 9/48* (2006.01)

(52) U.S. Cl.
CPC .............. *G06F 9/28* (2013.01); *G06F 9/4843* (2013.01); *G06F 9/5061* (2013.01); *G06F 9/5066* (2013.01); *G06F 9/5083* (2013.01)

(58) Field of Classification Search
CPC ....................................................... G06F 9/28
See application file for complete search history.

(56) References Cited

U.S. PATENT DOCUMENTS

| 8,418,181 | B1 | 4/2013 | Sirota et al. |
| 9,596,189 | B1 | 3/2017 | Lea et al. |
| 2009/0326869 | A1 | 12/2009 | Baba et al. |
| 2012/0330711 | A1 | 12/2012 | Jain et al. |

(Continued)

FOREIGN PATENT DOCUMENTS

| CN | 103369566 A | 10/2013 |
| CN | 105765946 A | 7/2016 |

OTHER PUBLICATIONS

Extended European Search Report for Application No. EP17164285.3, dated Nov. 6, 2017, 8 pages.

*Primary Examiner* — Sisley N Kim
(74) *Attorney, Agent, or Firm* — Harrity & Harrity, LLP

(57) ABSTRACT

A device may receive information identifying a set of tasks to be executed by a microservices application that includes a plurality of microservices. The device may determine an execution time of the set of tasks based on a set of parameters and a model. The set of parameters may include a first parameter that identifies a first number of instances of a first microservice of the plurality of microservices, and a second parameter that identifies a second number of instances of a second microservice of the plurality of microservices. The device may compare the execution time and a threshold. The threshold may be associated with a service level agreement. The device may selectively adjust the first number of instances or the second number of instances based on comparing the execution time and the threshold.

20 Claims, 7 Drawing Sheets

(56) References Cited

U.S. PATENT DOCUMENTS

| | | | |
|---|---|---|---|
| 2013/0007753 A1* | 1/2013 | Jain | G06F 9/46 |
| | | | 718/103 |
| 2013/0290972 A1 | 10/2013 | Cherkasova et al. | |
| 2014/0136779 A1 | 5/2014 | Guha et al. | |
| 2015/0378758 A1 | 12/2015 | Duggan et al. | |
| 2016/0381128 A1* | 12/2016 | Pai | G06F 9/5077 |
| | | | 709/203 |
| 2018/0181390 A1 | 6/2018 | Lepcha et al. | |

* cited by examiner

AUTOMATIC SCALING OF MICROSERVICES APPLICATIONS

RELATED APPLICATION

This application is a continuation of U.S. patent application Ser. No. 15/388,014, filed Dec. 22, 2016, which is incorporated herein by reference.

BACKGROUND

A microservices architecture may refer to a software application that includes a suite of independently deployable and modular applications that each execute a unique process and interact to achieve an overall functionality of the software application.

SUMMARY

According to some possible implementations, a device may include one or more processors to receive information identifying a set of tasks to be executed. The set of tasks may be associated with a microservices application. The microservices application may be associated with a set of microservices. The one or more processors may determine an execution time of the set of tasks based on a set of parameters and a model. The set of parameters may include, at least, a first parameter that identifies a number of tasks of the set of tasks, a second parameter that identifies a first number of instances of a first microservice of the set of microservices, a third parameter that identifies a first score associated with the first microservice of the set of microservices, a fourth parameter that identifies a second number of instances of a second microservice of the set of microservices, and a fifth parameter that identifies a second score associated with the second microservice of the set of microservices. The one or more processors may compare the execution time and a threshold. The one or more processors may selectively adjust the first number of instances of the first microservice or the second number of instances of the second microservice based on comparing the execution time and the threshold.

According to some possible implementations, a non-transitory computer-readable medium may store one or more instructions that, when executed by one or more processors of a device, cause the one or more processors to receive information identifying a set of tasks to be executed by a microservices application that includes a plurality of microservices. The one or more instructions may cause the one or more processors to determine an execution time of the set of tasks based on a set of parameters and a model. The set of parameters may include a first parameter that identifies a first number of instances of a first microservice of the plurality of microservices, and a second parameter that identifies a second number of instances of a second microservice of the plurality of microservices. The one or more instructions may cause the one or more processors to compare the execution time and a threshold. The threshold may be associated with a service level agreement. The one or more instructions may cause the one or more processors to selectively adjust the first number of instances or the second number of instances based on comparing the execution time and the threshold.

According to some possible implementations, a method may include receiving, by a device, information that identifies a set of tasks to be executed. The set of tasks may be associated with a microservices application. The microservices application may be associated with a set of microservices. The method may include determining, by the device, an execution time of the set of tasks based on a set of parameters. The set of parameters may include a first parameter that identifies a first number of instances of a first microservice of the set of microservices, a second parameter that identifies a first score associated with the first microservice, a third parameter that identifies a second number of instances of a second microservice, and a fourth parameter that identifies a second score associated with the second microservice of the set of microservices. The method may include determining, by the device, whether the execution time satisfies a threshold. The method may include selectively adjusting, by the device, the first number of instances or the second number of instances based on determining whether the execution time satisfies the threshold.

DETAILED DESCRIPTION

The following detailed description of example implementations refers to the accompanying drawings. The same reference numbers in different drawings may identify the same or similar elements.

A microservices application may include an application that includes a set of applications (e.g., microservices) that each performs a particular functionality of the microservices application, and that each interacts to perform an overall functionality of the microservices application. Microservices, of the microservices application, may be independently scalable. That is, a first microservice may be associated with a first number of instances that are executing, a second microservice may be associated with a second number of instances that are executing, etc.

In some cases, a scheduling device may inefficiently provision network devices to execute microservices (e.g., server devices that execute the microservices). For example, the scheduling device may provision an inadequate number of instances of a first microservice, and/or may provision a superfluous number of instances of a second microservice. In either case, resources (e.g., processor, memory, etc.) are inefficiently utilized.

Implementations described herein enable a scheduling platform to provision network devices such that resources are efficiently utilized. For example, the scheduling platform may receive information that identifies a set of tasks, associated with a microservices application, to be executed. In some implementations, a service level agreement (SLA) may indicate a time frame (e.g., an amount of time) in which the set of tasks are to be completed (e.g., a threshold). The scheduling platform may determine an execution time (e.g., an estimated execution time, such as an amount of time associated with executing each task of the set of tasks), of the set of tasks, based on a set of parameters and a model. Additionally, the scheduling platform may selectively and dynamically adjust a number of instances, of a microservice, based on the execution time. In this way, implementations described herein enable the scheduling platform to dynamically and automatically scale particular microservices such that an overall execution time may be reduced and/or satisfy the threshold associated with the SLA, thereby conserving processor and/or memory resources of network devices that are executing microservices, and/or conserving network resources.

Figure 1A:
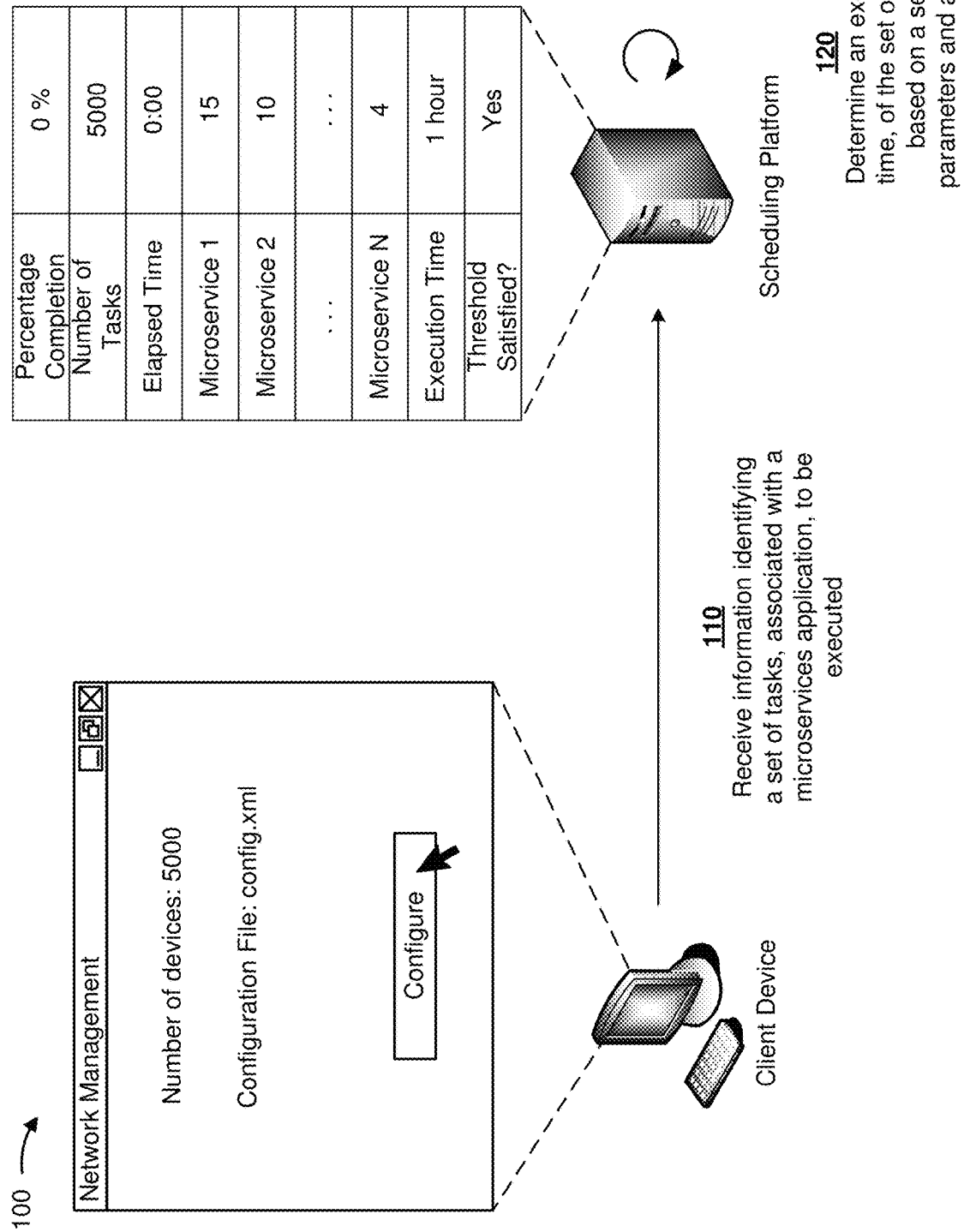
FIGS. 1A-1D are diagrams of an overview of an example implementation described herein.

FIGS. 1A-1D are diagrams of an overview of an example implementation 100 described herein. As shown in FIG. 1A, and by reference number 110, a scheduling platform (e.g., a server device) may receive information identifying a set of tasks, associated with a microservices application, to be executed. For example, assume that the microservices application provides functionality for configuring network devices (e.g., switches, routers, firewalls, etc.). Assume that a client device (e.g., a computing device) provides (e.g., based on an input from a user), to the scheduling platform, a request for the set of tasks to be executed. For example, assume that the set of tasks is associated with configuring 5000 network devices (e.g., 5000 tasks). Additionally, a service level agreement (SLA) between a user associated with the client device and a network operator associated with providing the microservices application (e.g., via the scheduling platform) may prescribe a time frame for which the set of tasks are to be executed. Assume that the time frame is 2 hours (e.g., a threshold).

As shown by reference number 120, the scheduling platform may determine an execution time of the set of tasks based on a set of parameters and a model. For example, the parameters may include information that identifies a percentage of completion of the set of tasks (e.g., 0%), a number of tasks (e.g., 5000), an elapsed time associated with the set of tasks (e.g., 0:00), and various numbers of instances of various microservices of the microservices application (e.g., 15 for microservice 1, 10 for microservice 2, and 4 for microservice N). In some implementations, the scheduling platform may determine an execution time (e.g., an estimated execution time) based on the model (e.g., an amount of time to execute the 5000 tasks). For example, as described elsewhere herein, the scheduling platform may train the model using information associated with previous executions of sets of tasks, and may use the model to predict execution times for other sets of tasks.

For example, as shown, the scheduling platform may determine an execution time of 1 hour. Additionally, as shown, the scheduling platform may determine that the execution time satisfies the threshold associated with the SLA (e.g., 2 hours). In this case, the scheduling platform may provision network devices to execute particular numbers of instances of the microservices (e.g., cause particular network devices to execute particular numbers of instances of the microservices) so as to complete execution of the set of tasks within the 2 hour time frame associated with the SLA.

Figure 1B:
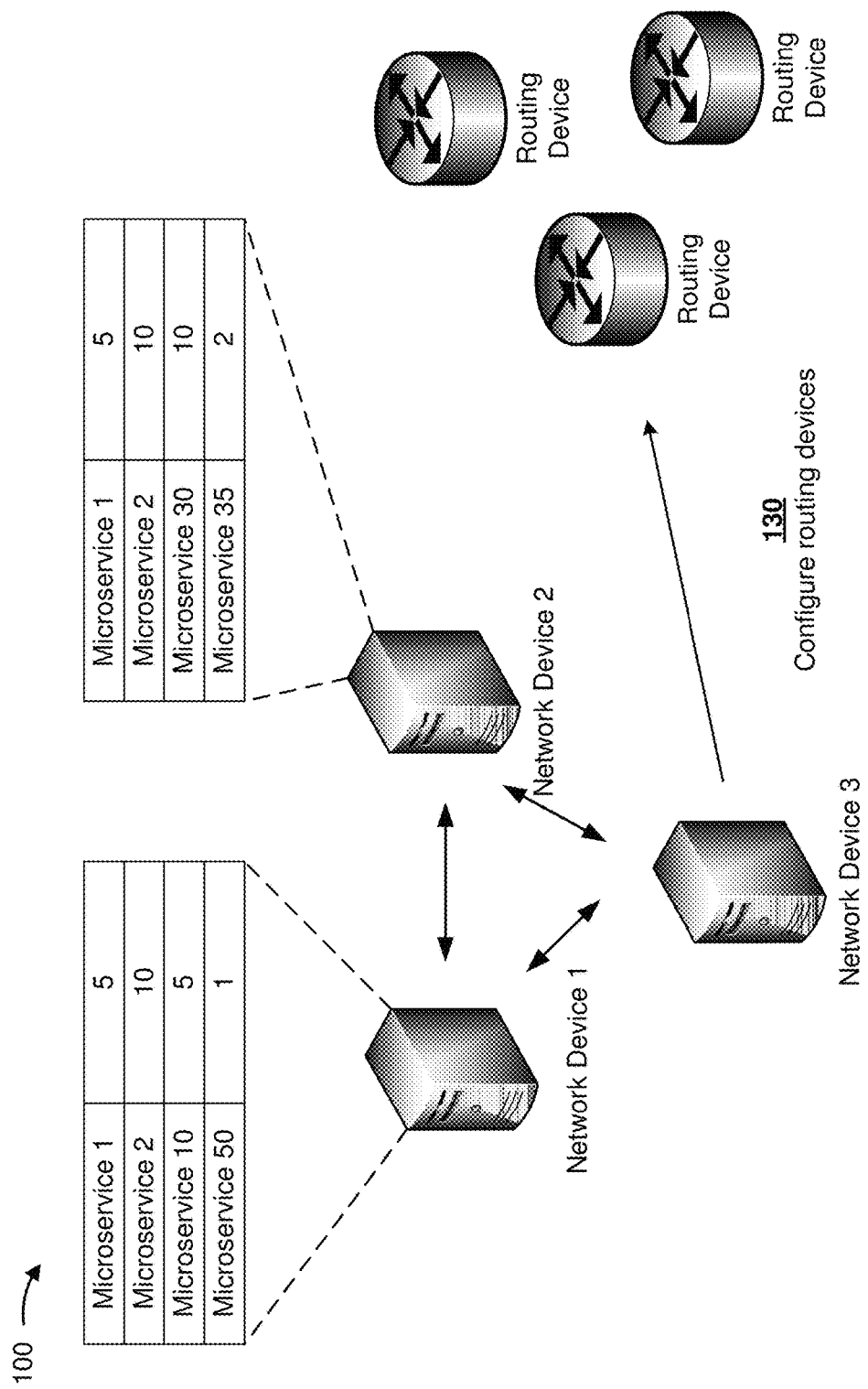

As shown in FIG. 1B, the network devices (e.g., that were provisioned by the scheduling platform) may execute the set of tasks. In some implementations, the microservices may interact to execute a task (e.g., microservices may execute various subtasks of a task). As an example, microservice 1 may execute a first subtask associated with a template service (e.g., transforming various configuration data into a configuration for a network device). Microservice 2 may execute a second subtask associated with a connectivity service (e.g., pushing a configuration to a network device). Because multiple instances of microservices are executing, multiple tasks may be executed in parallel. By executing tasks in parallel, an execution time may be reduced, thereby conserving processor and/or memory resources of network devices.

Figure 1C:
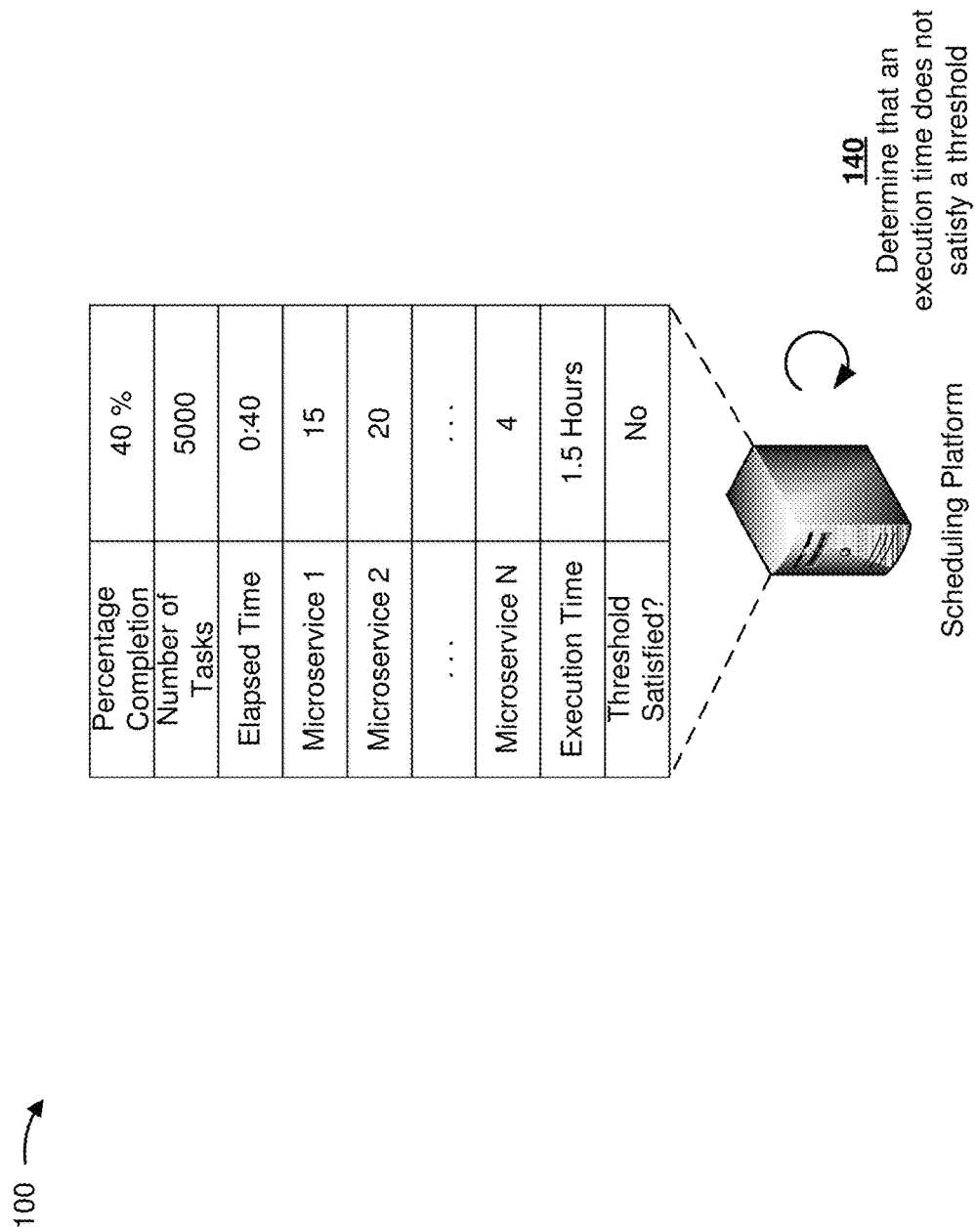

As shown in FIG. 1C, and by reference number 140, the scheduling platform may determine that an execution time does not satisfy a threshold. For example, in a similar manner as described above in connection with FIG. 1A, the scheduling platform may determine an execution time based on a set of parameters and the model. For example, as shown, the scheduling platform determines an execution time of 1.5 hours (e.g., an estimated time for the remaining set of tasks to be executed). Additionally, an elapsed time associated with the execution of the set of tasks is 40 minutes. Thus, in this case, an overall execution time of the set of tasks may be 2 hours and 10 minutes (e.g., an execution time that does not satisfy the threshold of 2 hours associated with the SLA).

Figure 1D:
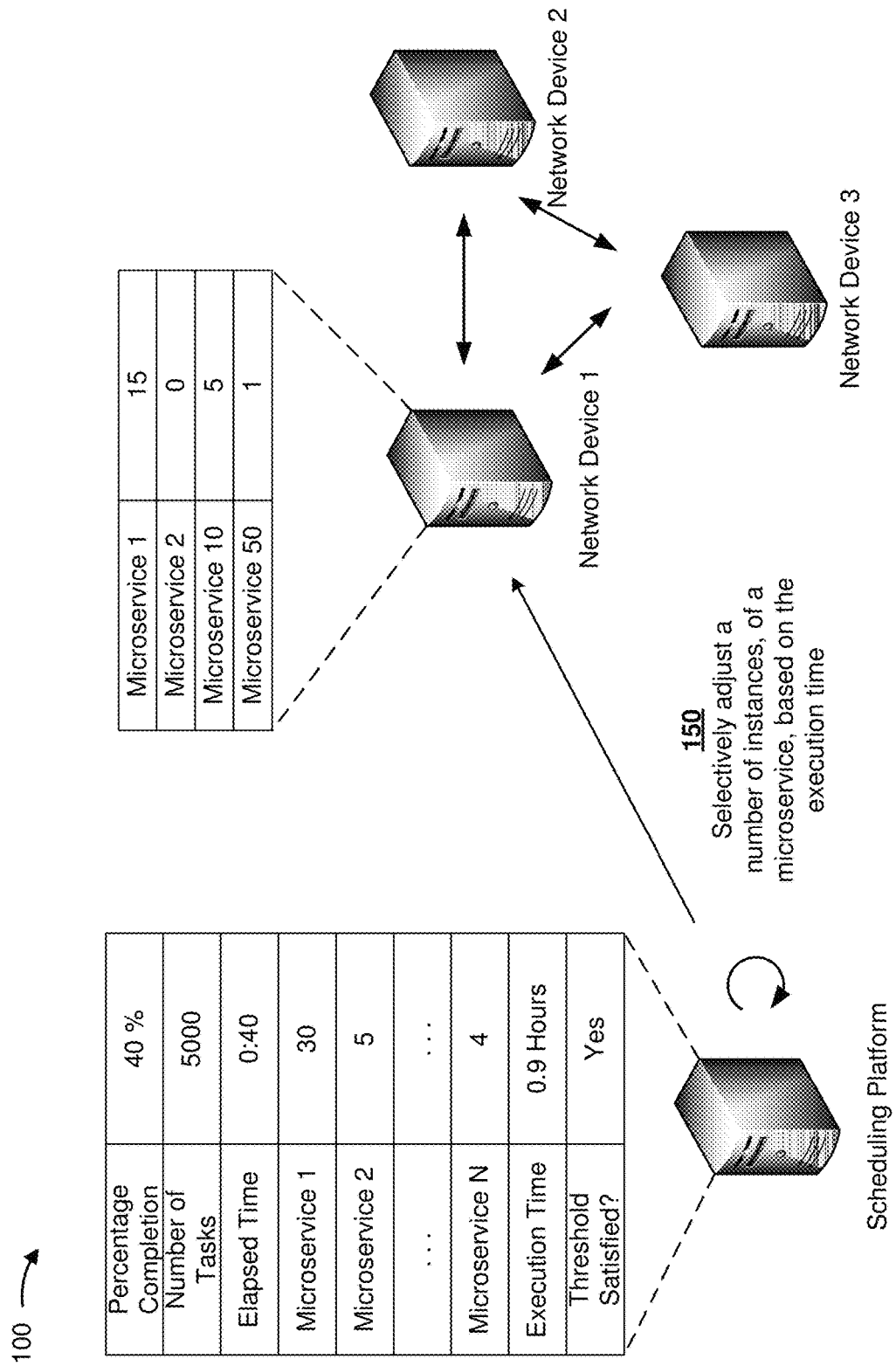

As shown in FIG. 1D, and by reference number 150, the scheduling platform may selectively adjust a number of instances, of a microservice, based on the execution time. For example, as shown, the scheduling platform may adjust a number of instances of microservice 1 (e.g., increase from 15 to 30), and may adjust a number of instances of microservice 2 (e.g., decease from 20 to 5). As described elsewhere herein, the scheduling platform may dynamically scale particular microservices based on scores, priorities, or the like.

For example, assume that microservice 1 is associated with a greater amount of execution time of a subtask than as compared to microservice 2, requires more resources than microservice 2, or the like. Additionally, microservice 2 may rely on an execution result of a subtask associated with microservice 1. In this way, more subtasks, associated with microservices 1, may execute in parallel, thereby decreasing an execution time associated with the set of tasks and thereby conserving processor and/or memory resources of network devices and/or scheduling platform. Additionally, in this way, a number of instances, of microservice 2, that are waiting for an execution result of microservice 1, may be reduced, thereby conserving processor and/or memory resources of network devices by more efficiently utilizing available resources than as compared to executing multiple instances of a microservice that remain idle.

As shown in FIG. 1D, the scheduling platform may determine that the execution time satisfies the threshold. For example, the elapsed time of 40 minutes and the execution time of 54 minutes may result in an overall execution time of 1 hour and 34 minutes, thereby satisfying the threshold of 2 hours.

By receiving information identifying a set of tasks, and determining their execution time based on various parameters and a model, the scheduling platform is able to dynamically and selectively adjust instances of various microservices, thereby enabling the set of tasks to be executed in an expected and/or an estimated amount of time. In this way, the scheduling platform can scale particular microservices in order to reduce an execution time of the set of tasks, and accordingly reduce use of processor and/or memory resources of devices that are executing microservices, and/or conserve network resources.

As indicated above, FIGS. 1A-1D are provided merely as an example. Other examples are possible and may differ from what was described with regard to FIGS. 1A-1D.

Figure 2:
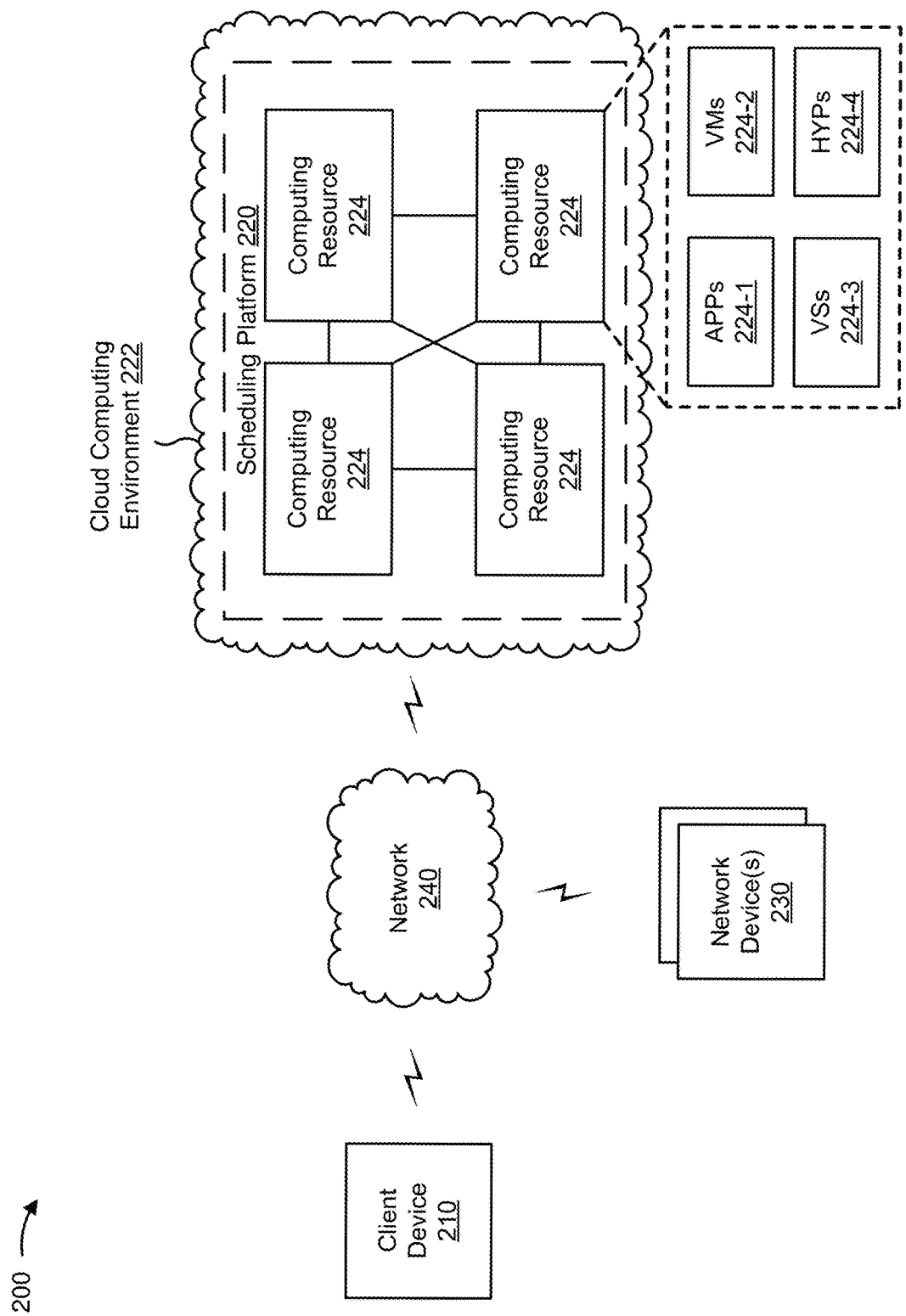
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a scheduling platform 220, a set of network devices 230, and a network 240. Devices of environment 200 may interconnect via wired connections, wireless connections, or a combination of wired and wireless connections.

Client device 210 includes one or more devices capable of receiving, generating, storing, processing, and/or providing information associated with a microservices application to be executed. For example, client device 210 may include a computing device, such as a desktop computer, a laptop computer, a tablet computer, a handheld computer, a server device, a mobile phone (e.g., a smart phone or a radiotelephone), or a similar type of device.

Scheduling platform 220 includes one or more devices capable of automatically and dynamically scaling microservices associated with a microservices application. In some implementations, scheduling platform 220 may be designed to be modular such that certain software components can be swapped in or out depending on a particular need. As such, scheduling platform 220 may be easily and/or quickly reconfigured for different uses. In some implementations, scheduling platform 220 may be implemented in network device 230 or a set of network devices 230.

In some implementations, as shown, scheduling platform 220 may be hosted in cloud computing environment 222. Notably, while implementations disclosed herein describe scheduling platform 220 as being hosted in cloud computing environment 222, in some implementations, scheduling platform 220 may not be cloud-based (i.e., may be implemented outside of a cloud computing environment) or may be partially cloud-based.

Cloud computing environment 222 includes an environment that hosts scheduling platform 220. Cloud computing environment 222 may provide computation, software, data access, storage, etc. services that do not require end-user (e.g., client device 210) knowledge of a physical location and configuration of system(s) and/or device(s) that hosts scheduling platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host scheduling platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by client device 210. Application 224-1 may eliminate a need to install and execute the software applications on client device 210. For example, application 224-1 may include software associated with scheduling platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., client device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network device 230 includes one or more devices capable of executing a microservices application. For example, network device 230 may include a firewall, a router, a gateway, a switch, a hub, a bridge, a reverse proxy, a server (e.g., a proxy server, a server executing a virtual machine, etc.), a security device, an intrusion detection device, a load balancer, or a similar device. In some implementations, network device 230 may execute a particular number of instances of a microservice or a set of microservices, associated with a microservices application, based on being provisioned by scheduling platform 220.

Network 240 includes one or more wired and/or wireless networks. For example, network 240 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
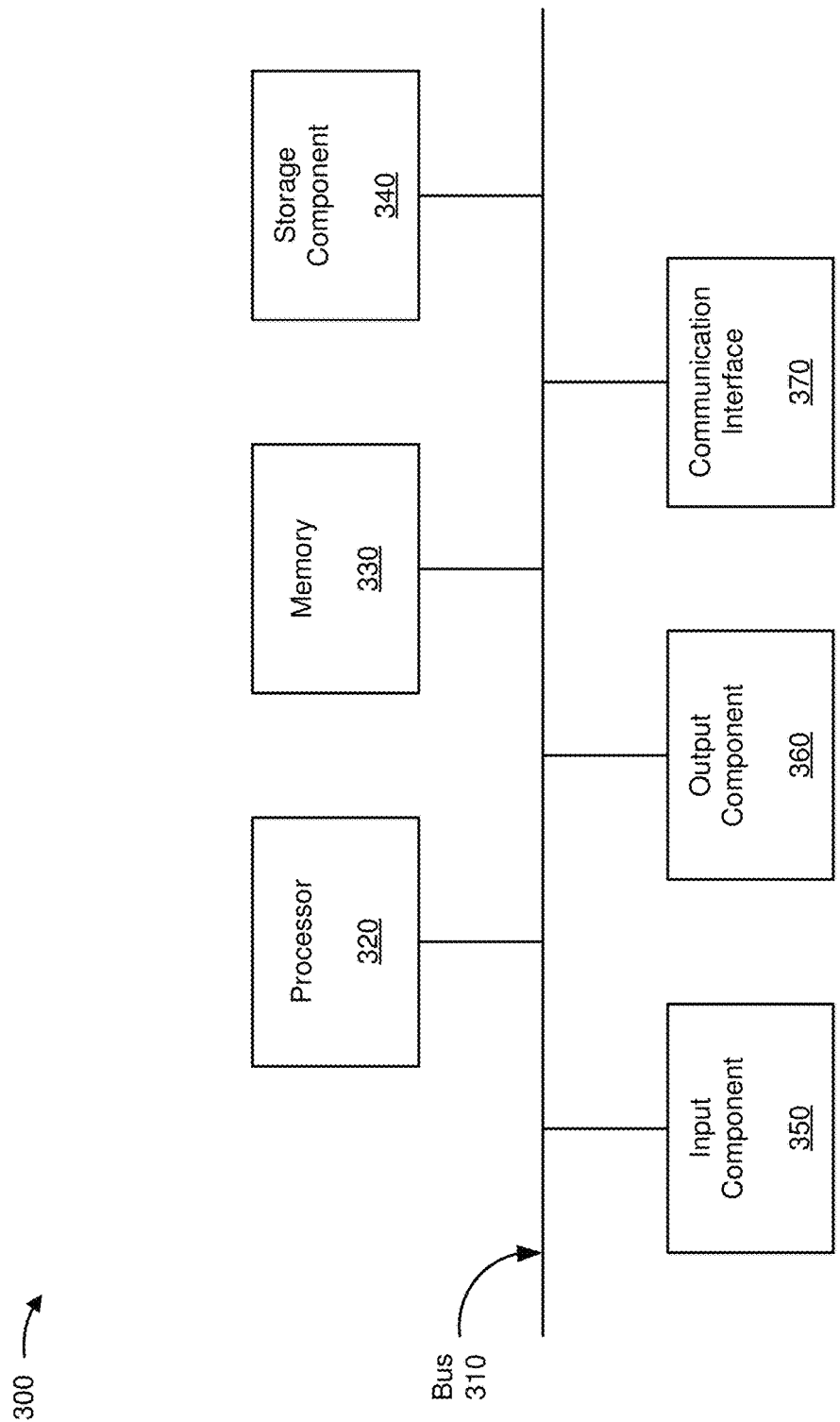
FIG. 3 is a diagram of example components of one or more devices of FIG. 2.

FIG. 3 is a diagram of example components of a device 300. Device 300 may correspond to client device 210, scheduling platform 220, and/or network device 230. In some implementations, client device 210, scheduling platform 220, and/or network device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
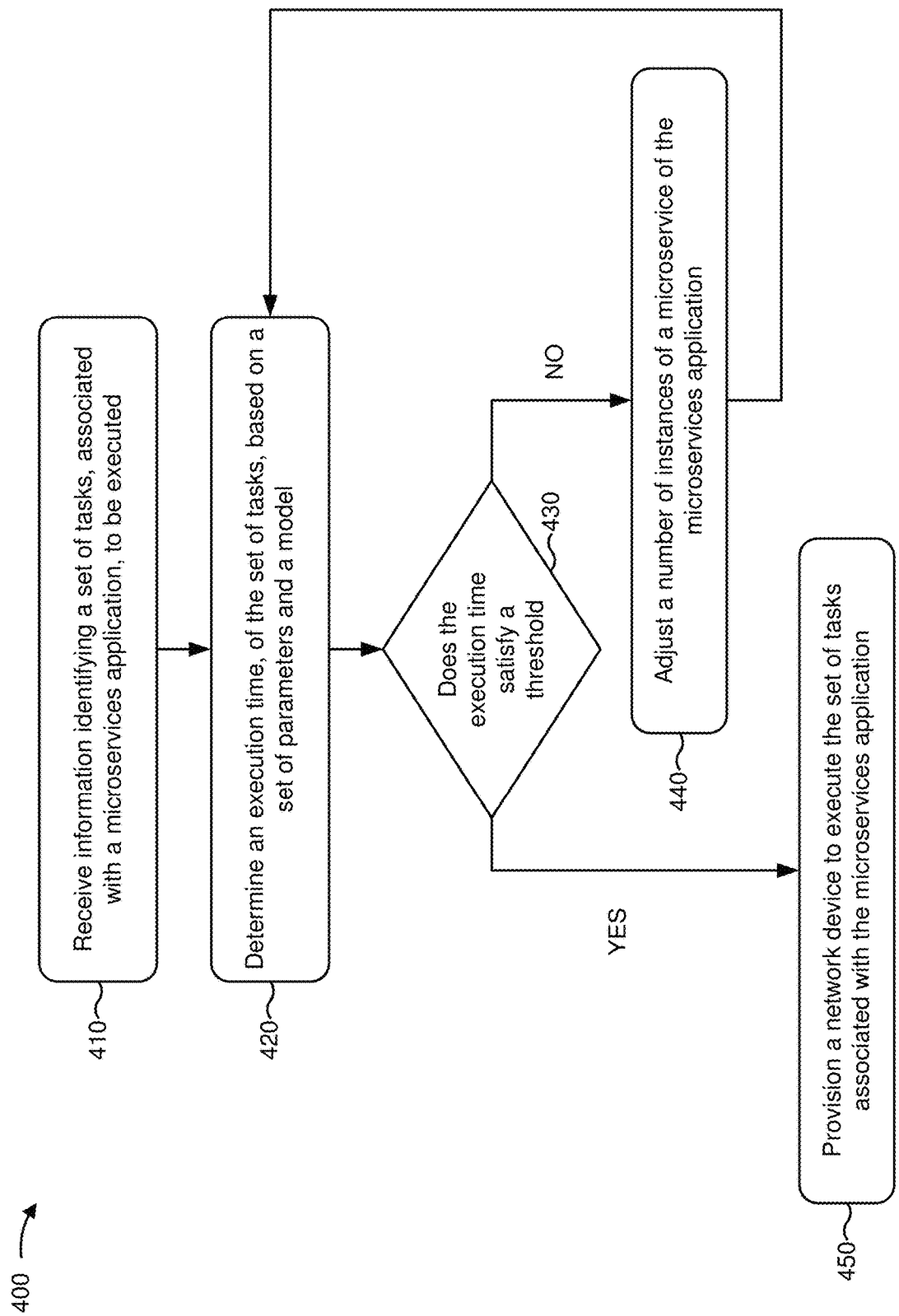
FIG. 4 is a flow chart of an example process for automatically adjusting a number of instances of a microservice based on an execution time of a set of tasks.

FIG. 4 is a flow chart of an example process 400 for automatically adjusting a number of instances of a microservice based on an execution time of a set of tasks. In some implementations, one or more process blocks of FIG. 4 may be performed by scheduling platform 220. In some implementations, one or more process blocks of FIG. 4 may be performed by another device or a group of devices separate from or including scheduling platform 220, such as client device 210 and/or network device 230.

As shown in FIG. 4, process 400 may include receiving information identifying a set of tasks, associated with a microservices application, to be executed (block 410). For example, scheduling platform 220 may receive information identifying a set of tasks, associated with a microservices application, to be executed. In some implementations, a microservices application may include an application that includes a set of microservices. In some implementations, a microservice may include an application that performs a particular functionality of the microservices application. In some implementations, the microservices application may be associated with hundreds, thousands, etc. of microservices.

In other words, microservices, of the microservices application, may refer to independent applications that interact (e.g., over a network) to perform an overall functionality of the microservices application. As an example, the microservices application may receive an input associated with a task to be executed, a first microservice may execute a first subtask of the task (e.g., associated with a particular functionality of the microservices application), and the first microservice may provide an execution result of the first subtask to a second microservice. Continuing with the example, the second microservice may then execute a second subtask of the task based on the execution result of the first subtask. In some implementations, the set of tasks may include thousands, millions, billions, etc. of tasks and/or subtasks.

In some implementations, microservices may provide execution results to other microservices via application programming interfaces (APIs), messaging queues, or the like. In this way, the set of microservices may perform respective subtasks, of a task, and interact (e.g., communicate execution results) to achieve an overall functionality of the microservices application.

In some implementations, the set of tasks may be associated with a job. For example, client device 210, may provide, to scheduling platform 220, a request for a job to be scheduled. In some implementations, scheduling platform 220 may receive, based on the request for the job to be scheduled, the information identifying the set of tasks to be executed. Additionally, or alternatively, an SLA may indicate a time frame for which the job is to be completed (e.g., an amount of time in which the sets of tasks is to be executed). As described elsewhere herein, scheduling platform 220 may determine a threshold (e.g., a threshold amount of time) based on the SLA, compare an execution time and the threshold, and selectively and dynamically scale particular microservices based on comparing the execution time and the threshold (e.g., to enable the job to complete within the threshold indicated by or determined from the SLA).

In some implementations, scheduling platform 220 may provision network devices 230 to execute the microservices application. For example, scheduling platform 220 may provision particular network devices 230 to execute a particular number of instances of microservices, as described elsewhere herein. In this way, microservices, of the microservices application, may be independently scaled, thereby enabling an execution time of the set of tasks to be adjusted (e.g., to satisfy the threshold associated with the SLA).

As further shown in FIG. 4, process 400 may include determining an execution time, of the set of tasks, based on a set of parameters and a model (block 420). For example, scheduling platform 220 may determine an execution time, of the set of tasks, based on a set of parameters and a model. In some implementations, an execution time may refer to a time frame (e.g., an amount of time) for the set of tasks to be executed. For example, the job may complete within a particular amount of time based on every task, of the set of tasks, being executed (e.g., the execution time). In some implementations, the execution time may refer to an estimated execution time. That is, scheduling platform 220 may use the model to estimate an execution time.

In some implementations, scheduling platform 220 may implement a machine learning technique to determine an execution time of the set of tasks. For example, scheduling platform 220 may use one or more artificial intelligence and/or machine learning techniques to analyze data (e.g., training data, such as historical execution times of particular tasks, etc.) and create models. The techniques may include, for example, supervised and/or unsupervised techniques, such as artificial networks, case-based reasoning, Bayesian statistics, learning automata, Hidden Markov Modeling, linear classifiers, quadratic classifiers, decision trees, association rule learning, or the like. Additionally, or alternatively, scheduling platform 220 may use another kind of computer-implemented technique, such as machine perception, or computer vision, to analyze data and generate models.

As an example, scheduling platform 220 may receive information that identifies the set of tasks, information that identifies parameters, and information that identifies an execution time of the set of tasks, and may train a model using the information. In this way, scheduling platform 220 may receive information that identifies tasks to be scheduled for execution, and may determine an execution time of the tasks based on the model and parameters associated with the tasks. In some implementations, scheduling platform 220 may implement a model to determine an execution time of the set of tasks. As a particular example, scheduling platform 220 may determine an execution time based on the following regression model:

$$H_\Theta(x)=\Theta_1+\Theta_2*(\text{type of microservices application})+\Theta_3*(\text{number of tasks})+\Theta_4*(\text{elapsed time})+\Theta_5*(\text{time period})+\Theta_6*(\text{percentage completion})+\Theta_7*(\text{number of instances of microservice 1}*\text{score})+\Theta_8*(\text{number of instances of microservice 2}*\text{score})+\ldots\Theta_n*(\text{number of instances of microservice }N*\text{score})$$

In some implementations, $\Theta_1, \Theta_2, \ldots, \Theta_n$ may include variables. For example, scheduling platform 220 may initialize the variables with particular values. Additionally, or alternatively, scheduling platform 220 may update (e.g., adjust) the values associated with the variables based on receiving additional information associated with executing additional sets of tasks. In some implementations, scheduling platform 220 may be configured with particular values for the variables, and adjust the values based on receiving information associated with sets of tasks that have been executed.

In some implementations, the model may include a set of parameters that are associated with the set of tasks. In some implementations, scheduling platform 220 may be configured with the set of parameters (e.g., by a network operator, or the like). Additionally, or alternatively, scheduling platform 220 may receive information that identifies particular values based on receiving a request for the set of tasks to be executed, and/or based on executing the set of tasks. As an example, scheduling platform 220 may receive information that identifies a number of tasks to be executed. As another example, scheduling platform 220 may determine an elapsed time and/or a percentage completion based on executing the set of tasks (e.g., as the job progresses).

In some implementations, a parameter may include information that identifies a type of microservices application associated with the set of tasks (e.g., "type of microservices application"). Additionally, or alternatively, a parameter may refer to information that identifies a number of tasks to be executed (e.g., "number of tasks"). Additionally, or alternatively, a parameter may refer to information that identifies an elapsed time associated with an execution of the set of tasks, such as an amount of time that has elapsed since the start of the execution of the set of tasks (e.g., "elapsed time").

Additionally, or alternatively, a parameter may refer to information that identifies a time period associated with the execution of the set of tasks, such as a time of day, a day of the week, a week of the month, etc. (e.g., "time period"). Additionally, or alternatively, a parameter may refer to information that identifies a percentage completion of the set of tasks, such as 50% if 500 tasks of 1000 tasks have been executed (e.g., "percentage completion").

Additionally, or alternatively, a parameter may include information that identifies a number of instances of a microservice (e.g., "number of instances of microservice 1," "number of instances of microservice 2," . . . "number of instances of microservice N"). Additionally, or alternatively, a parameter may include information that identifies a score associated with a microservice (e.g., a score, a rank, a value, a designation, a priority, etc.).

In some implementations, scheduling platform 220 may determine a score for a particular microservice based on a set of factors associated with the microservice. For example, scheduling platform 220 may determine values for a set of factors, such as an instruction metric associated with the microservice (e.g., lines of code (LOC) of the microservice, such as source lines of code (SLOC), physical SLOC, logical SLOC (LLOC), or the like), an execution time (e.g., historical execution times) of the microservice, a number of requests for the microservice to execute a subtask (e.g., a number of API calls from other microservices), a resource utilization of the microservice (e.g., processor, memory, etc.), an amount of time that the microservice is executing subtasks (e.g., not awaiting an execution result from another microservice), or the like.

In some implementations, scheduling platform 220 may determine a score for a microservice based on values associated with the set of factors. Additionally, or alternatively, scheduling platform 220 may assign particular weights to particular factors, and determine a score based on the weights. In this way, scheduling platform 220 may determine a first score for a first microservice, determine a second score for a second microservice, etc. For example, a first microservice that includes more lines of code may be associated with a higher score than a second microservice that includes fewer lines of code. As another example, a first microservice, that is associated with a greater amount of execution time (e.g., an amount of time in which the first microservice is executing a subtask) may be associated with a higher score than a second microservice that is associated with less execution time.

In some implementations, a score may be indicative of a particular microservice requiring more resources than another microservice (e.g., for the set of tasks to be executed within a time frame). For example, increasing a number of instances of a microservice that is associated with a high score may reduce an execution time of the set of tasks. Additionally, reducing a number of instances of a microservice that is associated with a low score may not significantly impact an execution time of the set of tasks (e.g., as compared to if a number of instances of a microservice that is associated with a high score is reduced).

In some implementations, scheduling platform 220 may train the model using training data (e.g., information associated with sets of tasks that have been executed, parameters associated with the sets of tasks, and execution times for the sets of tasks). For example, scheduling platform 220 may correlate known execution times and known parameters. In this way, scheduling platform 220 may use the model in association with particular parameter values, and determine (e.g., estimate) an execution time. In some implementations, scheduling platform 220 may use training data associated with a first set of microservices applications to train the model and then use the model with regard to a second set of microservices applications.

In some implementations, scheduling platform 220 may determine an initial number of instances, of each microservice, to execute based on the model. For example, scheduling platform 220 may input various values for parameters of the model, and determine an execution time based on the input values. Additionally, scheduling platform 220 may initially input a value that identifies the "type of microservices application" parameter, input a value that identifies a number of tasks to be executed for the "number of tasks" parameter, input a value that identifies an elapsed time (e.g., zero) for the "elapsed time" parameter, input a value that identifies a time associated with the "time period" parameter, input a value that identifies a percentage completion (e.g., zero) for the "percentage completion" parameter, and input values that identify respective numbers of instances of each microservice and respective scores of the microservices.

In some implementations, scheduling platform 220 may determine an initial number of instances of each microservice (e.g., a number of instances to provision to be executed). In some implementations, scheduling platform 220 may determine an amount of available resources (e.g., of network devices 230) that may be utilized to execute the microservices application. For example, scheduling platform 220 may receive, from network devices 230, information that identifies available resources of network devices 230. Scheduling platform 220 may determine an initial number of instances of each microservice based on the information that identifies the available resources. In some implementations, the amount of available resources may be limited. That is, no more than a threshold number of instances of microservices may be executed. As such, scheduling platform 220 may scale particular microservices such that the execution time may satisfy a threshold (e.g., associated with an SLA), as described elsewhere herein.

In some implementations, scheduling platform 220 may determine the initial number of instances of each microservice based on scores of the microservices. For example, scheduling platform 220 may, using the model, input a greater number of instances of a first microservice that is associated with a higher score than as compared to a second microservice that is associated with a lower score. As an example, the microservice associated with the highest score may be allocated the most instances, the microservice associated with the second highest score may be allocated the second most instances, etc. In some implementations, scheduling platform 220 may allocate instances in a linear manner (e.g., 2 instances for the microservice having the third highest score, 4 instances for the microservice having the second highest score, and 6 instances for the microservice having the highest score). Alternatively, scheduling platform 220 may allocate instances in an exponential manner (e.g., 4 instances for the microservice having the third highest score, 16 instances for the microservice having the second highest score, and 64 instances for the microservice having the highest score). These are just examples of ways that scheduling platform 220 may allocate instances of microservices. In practice, scheduling platform 220 may use a different allocation strategy.

In some implementations, scheduling platform 220 may determine an initial number of instances of each microservice based on information that identifies another set of tasks that was executed within a time frame. For example, scheduling platform 220 may identify another job that executed within a time frame (e.g., that satisfies the threshold associated with the SLA), determine an initial number of instances of microservices associated with the other job, and use the number of instances associated with the other job as initial values for the job (e.g., when initially provisioning network devices 230).

In this way, scheduling platform 220 may determine initial values for the set of parameters, determine an execution time based on the initial values and the model, and compare the execution time and a threshold, as described below.

As further shown in FIG. 4, process 400 may include determining whether the execution time satisfies a threshold (block 430). For example, scheduling platform 220 may determine whether the execution time satisfies a threshold. In some implementations, scheduling platform 220 may determine the threshold based on an SLA. For example, scheduling platform 220 may receive, from client device 210, information that identifies a job request, and an SLA may indicate a time frame for which the job is to be completed based on the job request (e.g., within a particular amount of time). As a particular example, assume that the SLA indicates that the job is to be completed (e.g., every task of the set of tasks is to be executed) within a time frame (e.g., 3 hours). In this case, the threshold may correspond to the time frame (e.g., the threshold is 3 hours) or may be determined based on the time frame (e.g., 90% of the time frame, 95% of the time frame, etc.). As described elsewhere herein, the threshold may change as an elapsed time of the job changes (e.g., may be offset by an amount of time associated with an elapsed time).

As further shown in FIG. 4, if the execution time does not satisfy the threshold (block 430—NO), then process 400 may include adjusting a number of instances, of a microservice, of the microservices application (block 440). For example, if the execution time does not satisfy the threshold, then scheduling platform 220 may adjust a number of instances of one or more microservices (e.g., to determine an execution time that does satisfy the threshold).

In some implementations, scheduling platform 220 may adjust a number of instances of a microservice based on the score of the microservice. For example, scheduling platform 220 may increase a number of instances of a first microservice that is associated with a highest score, and decrease a number of instances of a second microservice that is associated with a lowest score. Additionally, or alternatively, scheduling platform 220 may increase numbers of instances of the top (e.g., the top three, the top five, etc.) microservices (e.g., based on scores), and decrease numbers of instances of the bottom (e.g., the bottom three, the bottom five, etc.) microservices. In some implementations, scheduling platform 220 may decrease a number of instances of a first microservice to enable a second microservice to utilize resources that were allocated to the first microservice (e.g., based on a limited amount of available resources).

In this way, scheduling platform 220 may adjust a number of instances of microservices, and perform operations associated with block 420 (e.g., to determine if the updated number of instances of microservices may render the job capable of being completed within the threshold associated with the SLA).

As further shown in FIG. 4, if the execution time does satisfy the threshold (block 430—YES), then process 400 may include provisioning a network device to execute the set of tasks associated with the microservices application (block 450). For example, if the execution time satisfies the threshold, then scheduling platform 220 may provision network devices 230 to execute a number of instances of each microservice. In some implementations, scheduling platform 220 may provision an initial number of instances, of each microservice, to be executed by network devices 230 at the start of the execution of the set of tasks. For example, scheduling platform 220 may provision a number of instances, of each microservice, based on values used in association with the model (e.g., that were used to determine the execution time that satisfies the threshold).

In some implementations, scheduling platform 220 may initially provision network devices 230 to execute a particular number of instances of microservices based on determining an execution time that satisfies the threshold. Additionally, or alternatively, scheduling platform 220 may initially provision network devices 230 to execute a particular number of instances of microservices based on determining a minimum execution time (e.g., the lowest potential execution time, an optimized execution time, or the like). For example, scheduling platform 220 may adjust numbers of instances of particular microservices, determine execution times, and repeat until a lowest potential execution time or an optimized execution time is achieved or until a threshold number of iterations has been achieved. In this way, scheduling platform 220 may optimize an execution time by identifying a particular number of instances of microservices that may result in a lowest execution time, an optimized execution time, or the like. Additionally, in this way, implementations described herein conserve processor and/or memory resources of scheduling platform 220 and/or network devices 230, and/or conserve network resources.

In some implementations, scheduling platform 220 may perform operations of blocks 420-450 as the set of tasks are being executed. For example, scheduling platform 220 may perform iterations of the operations of blocks 420-450 at various intervals associated with an elapsed time and/or a percentage completion of the execution of the set of tasks (e.g., 5%, 10%, 20%, every five minutes, every twenty minutes, etc.). In this way, scheduling platform 220 may monitor an execution of the set of tasks, and selectively and dynamically adjust a number of instances of particular microservices if scheduling platform 220 determines that the execution of the set of tasks is not on pace for the total execution time to satisfy a threshold (e.g., thereby enabling particular microservices to be scaled such that the set of tasks may execute within the time frame). In this way, implementations described herein enable an execution time to be reduced, thereby conserving processor and/or memory resources of scheduling platform 220 and/or network devices 230, and/or conserving network resources.

In some implementations, scheduling platform 220 may determine additional thresholds as the set of tasks is being executed, and compare execution times (e.g., determined using the model) and the additional thresholds. For example, assume that the set of tasks is associated with an elapsed time of 1 hour. Additionally, assume that the threshold (e.g., time frame associated with the SLA) is 3 hours. In this case, scheduling platform may determine an execution time (e.g., as described in connection with block 420), and compare the execution time and a threshold of 2 hours (e.g., because the initial threshold associated with the SLA is 3 hours, and an hour has elapsed, or 3−1=2). That is, scheduling platform 220 may adjust a threshold associated with the SLA by an amount of time that has elapsed.

In some implementations, and in a similar manner as described above in connection with block 440, scheduling platform 220 may adjust a number of instances of microservices as the set of tasks are being executed (e.g., to enable the set of tasks to be completed within the time frame of the SLA).

In some implementations, if network devices 230 include additional resources that may be utilized to execute additional instances of particular microservices, then scheduling platform 220 may identify available resources that may be utilized by microservices. In some implementations, if network devices 230 reduce the amount of resources that can be used to execute additional instances of particular microservices, then scheduling platform 220 may adjust (e.g., decrease) a number of instances of a particular microservice. For example, scheduling platform 220 may identify a microservice associated with the lowest score, may identify microservices associated with the five lowest scores, etc., and decrease a number of instances of the microservice(s).

In some implementations, scheduling platform 220 may identify another set of tasks (e.g., associated with another job), and may decrease a number of instances of microservices that are executing in association with the other set of tasks. For example, scheduling platform 220 may determine whether another set of microservices, that are executing in association with another job, may be scaled down while still being capable of executing the other set of tasks in a particular time frame (e.g., pursuant to an SLA associated with the other job). In this way, scheduling platform 220 may adjust (e.g., decrease) a number of instances of particular microservices that are executing in association with the job, or another job, to enable other microservices to utilize resources that were allocated to the particular microservices.

In some implementations, scheduling platform 220 may adjust (e.g., increase) a number of instances of a particular microservice (e.g., based on adjusting the number of instances of another microservice, and/or based on identifying available resources). In some implementations, scheduling platform 220 may adjust a number of instances of a microservice that is associated with the greatest score. Additionally, or alternatively, scheduling platform 220 may adjust a number of instances of microservices that are associated with the top five highest scores, the top ten highest scores, etc.

In some implementations, scheduling platform 220 may determine an execution time based on adjusting the number of instances of the microservice(s), and determine whether the execution time satisfies a threshold (e.g., a threshold that is determined based on an initial threshold associated with the SLA and an elapsed time). For example, scheduling platform 220 may iteratively perform operations of blocks 420-450, and selectively adjust a number of instances of microservices. In this way, scheduling platform 220 may monitor an execution of a set of tasks, and dynamically scale particular microservices such that the set of tasks may be executed within a particular time frame.

In this way, implementations described herein enable scheduling platform 220 to automatically and dynamically scale microservices such that an overall execution time of a set of tasks may be reduced. In this way, implementations described herein conserve processor and/or memory resources of scheduling platform 220 and network devices 230, and/or conserve network resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The preceding descriptions indicate that a scheduling platform may dynamically and selectively adjust instances of microservices in order to reduce execution time of a set of tasks. The scheduling platform may receive information identifying a set of tasks, associated with a microservices application, to be executed. The scheduling platform may then determine an execution time of the set of tasks based on parameters and a model. An estimated time of execution will be based on the parameters and the model. The scheduling platform, while monitoring the parameters, can then make adjustments to instances of the microservices in order to have the set of tasks meet a required threshold time for execution. This dynamic and selective adjustment can conserve processor, memory, and network resources of the various devices executing the set of tasks.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
a memory; and
one or more processors to:
    receive information identifying a set of tasks to be executed,
        the set of tasks being associated with a microservices application,
        the microservices application being associated with a set of microservices, and
        the set of tasks to be executed by the microservices application associated with the set of microservices;
    determine an execution time of the set of tasks based on a set of parameters and a model,
        the set of parameters including at least:
            a first parameter that identifies a first score associated with a first microservice of the set of microservices, and a second parameter that identifies a second score associated with a second microservice of the set of microservices;

determine that the first microservice is associated with a greater amount of execution time of a first subtask, of a plurality of first subtasks, as compared to an execution time of a second subtask, of a plurality of second subtasks associated with the second microservice; and execute a greater Quantity of the plurality of first subtasks of the first microservice in parallel as compared to a quantity of the plurality of second subtasks of the second microservice.

2. The device of claim 1, where the one or more processors are further to:

determine a threshold,
the threshold being a threshold amount of time based on a service level agreement;

compare the execution time and the threshold; and selectively adjust a first number of instances of the first microservice or a second number of instances of the second microservice based on comparing the execution time and the threshold.

3. The device of claim 1, where the one or more processors are further to:

determine the first score for the first microservice based on a set of factors associated with the first microservice,
the set of factors including one or more of:
an instruction metric associated with the first microservice,
the execution time,
a number of requests of the first microservice to execute a subtask,
a resource utilization of the first microservice, or
an amount of time that the first microservice is executing one or more of the plurality of first subtasks.

4. The device of claim 1, where the one or more processors are further to:

determine that the second score for the second microservice is higher than the first score for the first microservice; and increase a second number of instances of the second microservice.

5. The device of claim 1, where the one or more processors are further to:

determine a first number of instances for the first microservice based on one or more of:
the model,
one or more resources associated with the first microservice, or
the first score of the first microservice; and determine a second number of instances for the second microservice based on one or more of:
the model,
one or more resources associated with the second microservice, or
the second score of the second microservice.

6. The device of claim 1, where the one or more processors, are further to:

adjust a first number of instances of the first microservice or a second number of instances of the second microservice by one or more of:
increasing the first number of instances of the first microservice when the first microservice is associated with a highest score, or
decreasing the second number of instances of the second microservice when the first microservice is associated with a lowest score; and determine whether the execution time based on the increased first number of instances and the decreased second number of instances satisfies a threshold,
the threshold being a threshold execution time based on a service level agreement.

7. The device of claim 1, where the one or more processors are further to: determine the execution time satisfies a threshold; and provision a network device to execute the set of tasks associated with the microservices application.

8. A non-transitory computer-readable medium storing instructions, the instructions comprising:

one or more instructions that, when executed by one or more processors of a first maintenance endpoint (MEP) device, cause the one or more processors to:

receive information identifying a set of tasks to be executed,
the set of tasks being associated with a microservices application,
the microservices application being associated with a set of microservices, and
the set of tasks to be executed by the microservices application associated with the set of microservices;

determine an execution time of the set of tasks based on a set of parameters and a model,
the set of parameters including at least:
a first parameter that identifies a first score associated with a first microservice of the set of microservices, and
a second parameter that identifies a second score associated with a second microservice of the set of microservices;

determine that the first microservice is associated with a greater amount of execution time of a first subtask, of a plurality of first subtasks, as compared to an execution time of a second subtask, of a plurality of second subtasks associated with the second microservice; and execute a greater quantity of the plurality of first subtasks of the first microservice in Parallel as compared to a quantity of the plurality of second subtasks of the second microservice.

9. The non-transitory computer-readable medium of claim 8, where the one or more instructions, when executed by the one or more processors, further cause the one or more processors to:

determine a threshold,
the threshold being a threshold amount of time based on a service level agreement;

compare the execution time and the threshold; and selectively adjust a first number of instances of the first microservice or a second number of instances of the second microservice based on comparing the execution time and the threshold.

10. The non-transitory computer-readable medium of claim 8, where the one or more instructions, when executed by the one or more processors, further cause the one or more processors to:

determine the first score for the first microservice based on a set of factors associated with the first microservice,
the set of factors including one or more of:
an instruction metric associated with the first microservice,
the execution time, a number of requests of the first microservice to execute a subtask,
a resource utilization of the first microservice, or
an amount of time that the first microservice is executing one or more of the plurality of first subtasks.

11. The non-transitory computer-readable medium of claim 8, where the one or more instructions, when executed by the one or more processors, further cause the one or more processors to:
determine that the second score for the second microservice is higher than the first score for the first microservice; and
increase a second number of instances of the second microservice.

12. The non-transitory computer-readable medium of claim 8, where the one or more instructions, when executed by the one or more processors, further cause the one or more processors to:
determine a first number of instances for the first microservice based on one or more of:
the model,
one or more resources associated with the first microservice, or
the first score of the first microservice; and
determine a second number of instances for the second microservice based on one or more of:
the model,
one or more resources associated with the second microservice, or
the second score of the second microservice.

13. The non-transitory computer-readable medium of claim 8, where the one or more instructions, when executed by the one or more processors, are further to: adjust a first number of instances of the first microservice or second number of instances of the second microservice by one or more of: increasing the first number of instances of the first microservice when the first microservice is associated with a highest score, or
decreasing the second number of instances of the second microservice when the first microservice is associated with a lowest score; and
determine whether the execution time based on the increased first number of instances and the decreased second number of instances satisfies a threshold,
the threshold being a threshold execution time based on a service level agreement.

14. The non-transitory computer-readable medium of claim 8, where the one or more instructions, when executed by the one or more processors, further cause the one or more processors to:
determine the execution time satisfies a threshold; and
provision a network device to execute the set of tasks associated with the microservices application.

15. A method, comprising:
receiving information identifying a set of tasks to be executed,
the set of tasks being associated with a microservices application,
the microservices application being associated with a set of microservices, and
the set of tasks to be executed by the microservices application associated with the set of microservices;
determining an execution time of the set of tasks based on a set of parameters and a model,
the set of parameters including at least:
a first parameter that identifies a first score associated with a first microservice of the set of microservices, and
a second parameter that identifies a second score associated with a second microservice of the set of microservices;
determining that the first microservice is associated with a greater amount of execution time of a first subtask, of a plurality of first subtasks, as compared to an execution time of a second subtask, of a plurality of second subtasks associated with the second microservice; and
executing a greater quantity of the plurality of first subtasks of the first microservice in parallel as compared to a quantity of the plurality of second subtasks of the second microservice.

16. The method of claim 15, further comprising:
determining a threshold,
the threshold being a threshold amount of time based on a service level agreement;
comparing the execution time and the threshold; and
selectively adjusting a first number of instances of the first microservice or a second number of instances of the second microservice based on comparing the execution time and the threshold.

17. The method of claim 15, further comprising:
determining the first score for the first microservice based on a set of factors associated with the first microservice,
the set of factors including one or more of:
an instruction metric associated with the first microservice,
the execution time,
a number of requests of the first microservice to execute a subtask,
a resource utilization of the first microservice, or
an amount of time that the first microservice is executing one or more of the plurality of first subtasks.

18. The method of claim 15, further comprising:
determining that the second score for the second microservice is higher than the first score for the first microservice; and
increasing a second number of instances of the second microservice.

19. The method of claim 15, further comprising: adjusting a first number of instances of the first microservice or a second number of instances of the second microservice by one or more of:
increasing the first number of instances of the first microservice when the first microservice is associated with a highest score, or
decreasing the second number of instances of the second microservice when the first microservice is associated with a lowest score; and
determining whether the execution time based on the increased first number of instances and the decreased second number of instances satisfies a threshold,
the threshold being a threshold execution time based on a service level agreement.

20. The method of claim 15, further comprising: determining the execution time satisfies a threshold; and
provisioning a network device to execute the set of tasks associated with the microservices application.

* * * * *